Oct. 21, 1969 C. E. LENZ 3,474,414
WAVE-EDGE COMPARATOR
Filed March 21, 1967 3 Sheets-Sheet 1
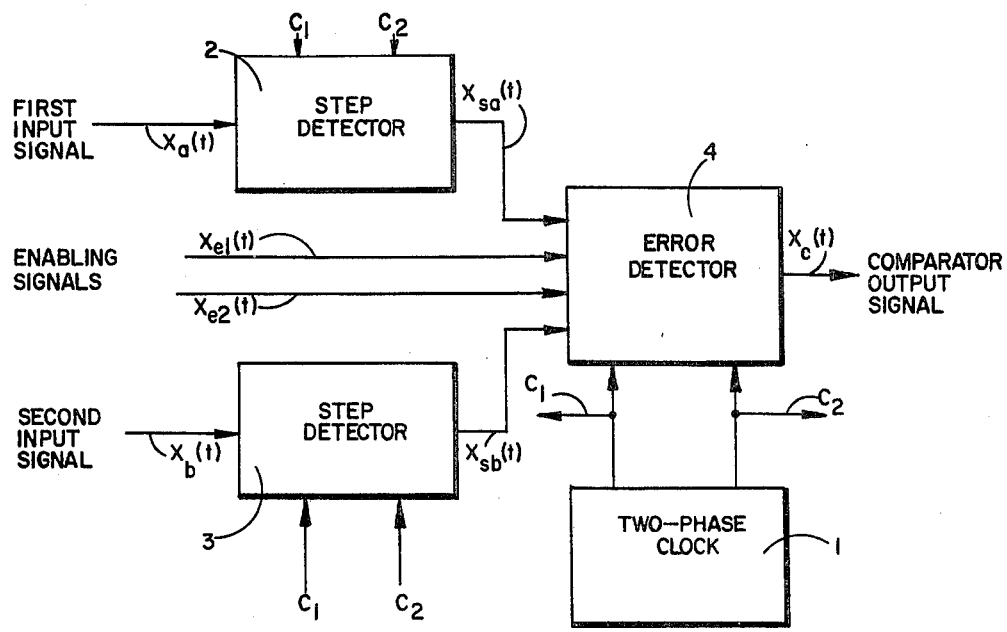
FIG. 1
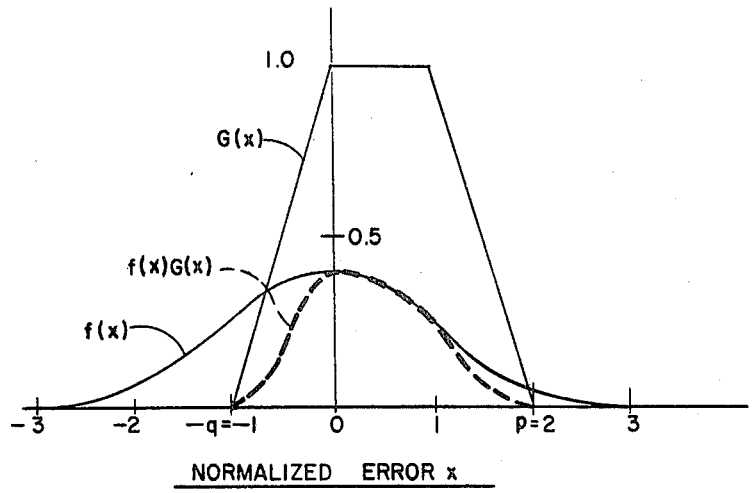
FIG. 2
*INVENTOR.*
CHARLES E. LENZ
BY
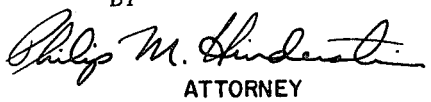
ATTORNEY

INVENTOR.
CHARLES E. LENZ

United States Patent Office 3,474,414
Patented Oct. 21, 1969

3,474,414
WAVE-EDGE COMPARATOR
Charles E. Lenz, Honolulu, Hawaii, assignor to North American Rockwell Corporation
Filed Mar. 21, 1967, Ser. No. 624,783
Int. Cl. G08b 29/00
U.S. Cl. 340—146.1          10 Claims

ABSTRACT OF THE DISCLOSURE

A system for generating an output if a first signal occurs within an interval starting a specified time before and ending a specified time after a second signal. The first and second signals are applied to a pair of step detectors, each of which is operative to generate a pulse upon the occurrence of a specified transition of its input signal. The pulses from the step detectors are applied to an error detector which generates an output pulse if the time displacement between two adjacent input pulses satisfies the condition specified above.

BACKROUND OF THE INVENTION

Field of the invention

The present invention relates to a wave-edge comparator and, more particularly, to a system for generating an output signal which indicates whether the displacement between specified transition times of two input signals lies within prescribed bilateral tolerances.

Description of the prior art

In numerous types of prior-art electronic systems, it is necessary to know the time of occurrence of a specified event. Furthermore, in such prior-art systems, it is often necessary to know whether a first specified event occurs within an interval starting a predetermined time before and ending a predetermined time after a second specified event. It therefore becomes necessary to provide a system for generating a time-varying output signal which will indicate whether the time displacement between specified events lies within prescribed bilateral tolerances. In addition, for a fully versatile system, the absolute values of the bilateral tolerances should not have to be equal.

Several prior-art systems have been proposed to meet these requirements, but none has been fully successful. Each specified event is generally converted into an electrical signal, a predetermined characteristic of which changes its value upon the occurrence of the event. These electrical signals then provide the inputs to the comparator. In many of these prior-art systems, it is necessary for at least one of the input signals to be fully synchronized with a timing means. This requirement has an obvious disadvantage where it is necessary to compare two randomly occurring signals. In still other prior-art systems, the range of values of the time displacement between the two input signals which will cause a signal to appear at the comparator output is established in terms of unilateral tolerances. In other words, a first signal must occur within an interval of predetermined length which either starts or ends with occurrence of a second signal in order to generate an output signal. Such operation is unsatisfactory in most applications because it is usually necessary to construct a system which will generate an output if the first signal occurs within an interval starting a specified time before the second signal in order to establish the positive tolerance and ending a specified time after the second signal in order to establish the negative tolerance. In addition, a truly versatile comparator permits variation of the positive and negative tolerances without basic design modification, an objective which has not been attained heretofore. Finally, the known devices are usually complex, requiring time-consuming interpretations of each measurement, and require frequent calibration to avoid deterioration of the accuracy of the system.

SUMMARY OF THE INVENTION

It is the purpose of the present invention to provide a system which eliminates all of the fundamental limitations of prior-art systems. According to the present invention, each specified event is first converted into a logical signal, i.e., upon occurrence of the specified event, the signal level goes through a transition from the logical value of 0 to the logical value of 1. These logical signals provide the inputs to the wave-edge comparator which is operative to generate a logical, time-varying output signal that indicates, with a known degree of certainty, whether or not the displacement between the specified transition times of the two logical signals lies within prescribed bilateral tolerances. Such a device is useful for comparing, on a "go" or "no-go" basis, any two quantities which can be transformed into time displacements. Typical applications for such a device include automatic built-in test equipment for avionic systems and test elements for automatic machine tools. With the system of the present invention, the range of values of the time displacement which will cause a signal to appear at the comparator output is established in terms of quantized bilateral tolerances. The ability to program the comparator in a manner which conforms to standard engineering practice in specifying tolerances results. An attendant advantage is the elimination of unnecessary computation in programming the comparator to meet given specifications. An additional advantage of the present system is that the range of the permissible value of the time error is expressed in terms of bilateral tolerances which can be unequal. Increased versatility of the comparator results, and the computation necessary in programming the comparator to conform to specifications is thereby still further reduced. Another feature of the present invention is that the comparator can accommodate two arbitrary input signals without requiring either signal to be synchronized. Full compatibility with input signals which represent analog quantities as continuously variable time displacement results. An associated advantage is the ability to provide from such input signals a comparator output signal which can be utilized directly by an on-line digital computer.

The comparator of the present invention is fully synchronized so that its output signal rises and falls at times which are accurately controlled by a clock signal. This feature also contributes to full compatibility with on-line digital computational equipment. An additional advantage is the elimination of equipment to synchronize operation of the wave-edge comparator with that of an associated digital computer. The versatile nature of the present comparator permits convenient variation of tolerances without basic design modifications. A comparator applicable to a variety of requirements, in rapid sequence if necessary, results. An attendant advantage is the ability to meet many requirements with a single product design, or even with a single comparator by means of switching. Tolerances may be varied automatically or remotely where required.

The present comparator provides a "go" or "no-go" indication rapidly. Elimination of complex and time-consuming interpretation of each measurement results. Corresponding advantages are the elimination of unnecessary associated logical decision-making devices and the minimization of the effects of time variation of the error while a measurement is being made.

The accuracy and resolution of the present comparator are established by a highly stable crystal clock, thereby eliminating frequent comparator calibration. Continuing repeatability of measurements results. An associated advantage is the small amount of maintenance required by this type of comparator.

The present comparator performs all required functions by utilizing components having only two states. A fully digital comparator results which provides the advantage of stability in the presence of environmental variations, voltage changes, and aging to a greater extent than that attainable with an analog device. In addition, the comparator utilizes no monostable elements, thereby providing greater noise immunity than would otherwise be possible. A corresponding advantage is an increase in the reliability of the output signal generated.

In accordance with this invention, there is provided a comparator whose basic inputs are a first input signal and a second input signal with which it is to be compared. In addition, an arbitrary number of enabling signals can be accommodated. All such enabling signals must be present simultaneously to permit operation of the comparator. The comparator has a single output signal in the form of a pulse. This output pulse appears when, and only when, a 0-to-1 transition of the first input signal occurs no earlier than a specified time before and no later than a specified time after a 0-to-1 transition of the second input signal. The length of the output pulse, when present, depends upon the relative times of adjacent 0-to-1 transitions of the two input signals.

The basic components of the wave-edge comparator are a two-phase clock, two identical step detectors, and an error detector. The two-phase clock receives no input signals, but generates periodic primary and secondary clock signals for synchronizing operation of all other basic components. Both clock signals are identical except for time displacement Each of the identical step detectors utilizes the clock signals for synchronization. In addition, each accepts a different one of the input signals to be compared. Each step detector generates a pulse shortly after each 0-to-1 transition of its input signal. The error detector utilizes the clock signals for synchronization and will operate only when the enabling signals simultaneously have the logical value 1. The error detector also receives the output signals furnished by the step detectors and is operative to provide an output pulse if the displacement between two adjacent pulses from the step detectors falls within predetermined tolerances.

It is, therefore, an object of the present invention to provide a wave-edge comparator which is operative to generate an output signal when the displacement between specified transition times of two input signals lies within prescribed bilateral tolerances.

It is a further object of the present invention to provide a wave-edge comparator wherein the range of values of the time displacement which will cause an output is established in terms of quantized bilateral tolerances.

It is a still further object of the present invention to provide a wave-edge comparator in which the range of permissible values of the time displacement is expressed in terms of bilateral tolerances which can be unequal.

It is another object of the present invention to provide a wave-edge comparator which will accommodate two arbitrary input signals without requiring either signal to be synchronized.

It is still another object of the present invention to provide a fully synchronized comparator output signal which rises and falls at times that are accurately controlled by a clock signal.

Another object of the present invention is to provide a wave-edge comparator which permits convenient variation of tolerances without basic design modification.

Still another object of the present invention is to provide a wave-edge comparator which generates a "go" or "no-go" indication rapidly.

Still other objects, features, and attendant advantages of the present invention will become apparent to those skilled in the art from a reading of the following detailed description of the preferred embodiment constructed in accordance therewith, taken in conjunction with the accompanying drawings wherein:

BRIEF DESCRIPTION OF THE DRAWING

FIGURE 1 is a block diagram showing the basic components of the wave-edge comparator of the present invention;

FIGURE 2 is a graph showing the probability of an output signal being generated when both input signals are asynchronous and statistically independent of the clock signals;

DESCRIPTION OF THE PREFERRED EMBODIMENT

Figure 3:
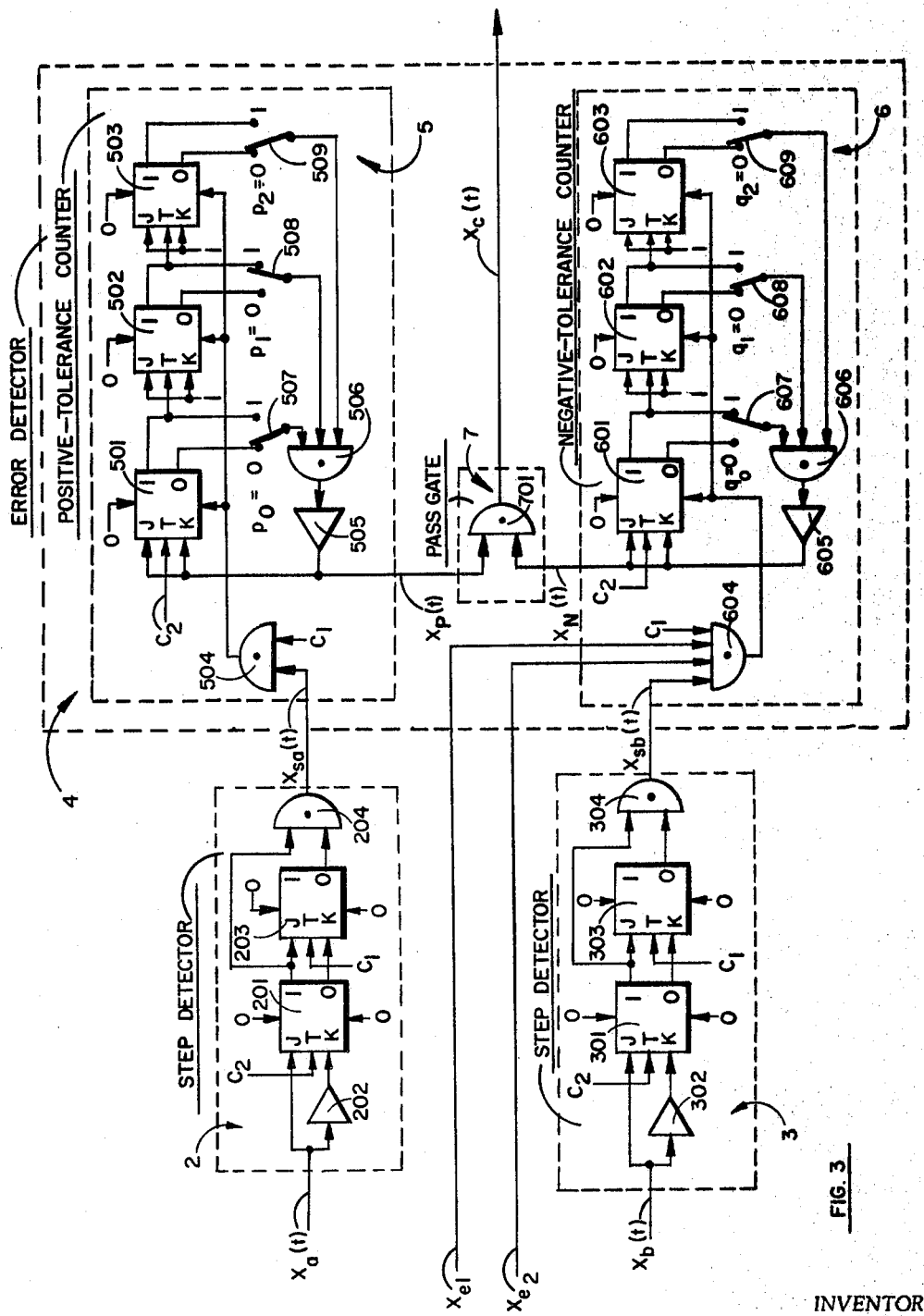
FIGURE 3 is a more detailed diagram of the components of the present invention.

Referring now to the drawings and, more particularly, to FIGURE 1 thereof, there is shown a block diagram of the wave-edge comparator. The comparator will be discussed in terms of the required inputs, the output generated, and the functions of the basic components. All transmission of information to and from the comparator and between components is by means of two-level logical electrical signals, one such level being assigned the logical value 1 and the other level being assigned the logical value 0. In addition, each signal input and output is normally false, i.e., normally has the logical value 0.

As shown in FIGURE 1, the basic components of the wave-edge comparator are a two-phase clock 1, identical step detectors 2 and 3, and an error detector 4. Two-phase clock 1 receives no input signals but is operative to generate periodic primary and secondary clock signals $C_1(t)$ and $C_2(t)$, respectively, each a function of time $t$ and having a period $\tau$, for synchronizing operation of all other basic components. All times will be expressed in seconds. Both clock signals are identical except for time displacement, i.e., $$C_2(t) = C_1\left(t + \frac{\tau}{2}\right) \qquad (1)$$

Each clock signal is normally false. The clock pulse length, $\tau_c$, typically lies within the interval $$0 < \tau_c \leq \frac{\tau}{4} \qquad (2)$$

During each such interval, a clock pulse remains continuously true, i.e., has the logical value 1. When $t > 0$, the initial $C_1(t)$ pulse is last true at $t = \tau$.

The basic inputs to the compartor are the first input signal $X_a(t)$ and the second input signal $X_b(t)$ with which $X_a(t)$ is to be compared. The comparator is designed to accommodate only basic input signals for which adjacent transitions of the same signal are separated by no less than $\tau + \tau_e$, where $\tau_e$ is the enabling time of the type of flip-flop employed in step detectors 2 and 3 and error detector 4. Normally, however, such transitions will be separated by a considerably larger interval than this minimum. For present purposes, at least the 0-to-1 transitions of $X_b(t)$ will be assumed to be initiated by 1-to-0 transitions of the clock signal $C_1(t)$.

In addition to the basic inputs to the comparator, an arbitrary number $\eta$ of enabling signals can be accommodated. All such enabling signals must be true simultaneously to permit operation of the comparator. Thus, to enable the comparator, the logical relation $$\prod_{i=1}^{\eta} X_{ei}(t) = 1 \qquad (3)$$

must be satisfied. In the particular case to be described below where $\eta=2$, Relation (3) reduces to $$X_{e1}(t)X_{e2}(t)=1 \qquad (4)$$

The comparator has the single output $X_c(t)$. A true pulse appears at $X_c(t)$ when, and only when, a 0-to-1 transition of $X_a(t)$ occurs no earlier than $(p-\frac{1}{2})\tau$ before and no later than $(q-\frac{1}{2})\tau$ after a 0-to-1 transition of $X_0(t)$, where the positive integers $p$ and $q$ are design parameters of the comparator. Thus, if a 0-to-1 transition of $X_a(t)$ occurs at time $t_{ai}{}^+$ for each positive value of the integer $i$ and a 0-to-1 transition of $X_b(t)$ occurs at time $t_{bk}{}^+$ for each positive value of the integer $k$, then an $X_c(t)$ pulse will occur only for those sets of permissible values of $i$ and $k$ for which $$(p-\frac{1}{2})\tau+\tau_e > \epsilon = t_{bk}{}^+ - t_{ai}{}^+ > (\frac{1}{2}-q)\tau-\tau_e \qquad (5)$$

where $\epsilon$ is the time-difference error between specific 0-to-1 transitions of $X_a(t)$ and $X_b(t)$. To represent equal bilateral tolerances or for other reasons, appropriate parameter choice can make the effect of $\tau_e$ negligible in Relation (5).

The length of an output pulse, when present, depends upon the relative times of adjacent 0-to-1 transitions of $X_a(t)$ and $X_b(t)$. An $X_c(t)$ pulse can have any length $(j-\frac{1}{2})\tau+\tau_c$ for which the integer $j$ satisfies the relation $$0 < j \leq \rho \qquad (6)$$

where $$\rho = \begin{cases} p, & p \leq q \\ q, & q < p \end{cases} \qquad \begin{matrix} (7a) \\ (7b) \end{matrix}$$

Step detectors 2 and 3 are identical. Each has as inputs the clock signals $C_1(t)$ and $C_2(t)$ for synchronization. In addition, each step detector accepts one of the input signals to be compared, step detector 2 accepting $X_a(t)$ and step detector 3 accepting $X_b(t)$. Step detectors 2 and 3 generate the normally false output signals $X_{sa}(t)$ and $X_{sb}(t)$, respectively. The signal $V_{sa}(t)$ goes true for a period $\tau/2$ soon after each 0-to-1 transition of $X_a(t)$. Similarly, the signal $X_{sb}(t)$ goes true for a period $\tau/2$ shortly after each 0-to-1 transition of $X_b(t)$. If $X_a(t)$ goes true at time $t_{ai}{}^+$, where $i$ is a positive integer, then $X_{sa}(t)$ will go true at time $t_{sai}{}^+$ in response to the next $C_2(t)$ trailing edge at least $\tau_e$ later. It follows that $$t_{ai}{}^+ + \tau_e < t_{sai}{}^+ = (m-\frac{1}{2})\tau + \delta \leq t_{ai}{}^+ + \tau + \tau_e \qquad (8)$$

The similar relationship between $X_b(t)$ and $X_{sb}(t)$ is $$t_{bk}{}^+ + \tau_e < t_{sbk}{}^+ = (n-\frac{1}{2})\tau + \delta = t_{bk}{}^+ + \tau + \tau_e \qquad (9)$$

In Relations (8) and (9), the positive integers $m$ and $n$ are chosen to satisfy the inequalities shown, and $\delta$ is a vanishingly small positive quantity representing the response time of the logic elements involved.

Error detector 4 also utilizes the clock signals $C_1(t)$ and $C_2(t)$ for synchronization. Error detector 4 will operate only when the enabling signals $X_{e1}(t)$ and $X_{e2}(t)$ are simultaneously true. The basic inputs of error detector 4 are the signals $X_{sa}(t)$ and $X_{sb}(t)$ furnished by step detectors 2 and 3. Error detector 4 has the single normally false output signal $X_c(t)$, which constitutes the only output of the wave-edge comparator.

The basic purpose of error detector 4 is to provide a true output pulse at $X_c(t)$ if the displacement between adjacent $X_{sa}(t)$ and $X_{sb}(t)$ pulses is within predetermined tolerances. Let the $i$th $X_{sa}(t)$ pulse when $t>0$ have a 1-to-0 transition at time $$t_{sai}{}^- = m\tau + \delta \qquad (10)$$

where $m$ is a positive integer and $\delta$ is the vanishingly small positive quantity already described. Similarly, let the $k$th $X_{sb}(t)$ pulse when $t>0$ have a 1-to-0 transition at time $$t_{sbk}{}^- = n\tau + \delta \qquad (11)$$

where $n$ is a positive integer. An $X_c(t)$ pulse will result from the $i$th $X_{sa}(t)$ pulse and the $k$th $X_{sb}(t)$ pulse if, and only if, $$p\tau > t_{sbk}{}^- - t_{sai}{}^- > -q\tau \qquad (12)$$

If Relation (12) is satisfied, an output pulse from the error detector will occur. The output $X_c(t)$ will remain true for the interval $$t_{cr}{}^+ \leq t \leq t_{cr}{}^- \qquad (13)$$

where $r$ is a positive integer, where $$t_{cr}{}^+ = \begin{cases} t_{sai}{}^- - \tau_0, & t_{sai}{}^- > t_{sbk}{}^- \\ t_{sbk}{}^- - \tau_0, & t_{sai}{}^- \leq t_{sbk}{}^- \end{cases} \qquad \begin{matrix}(14a)\\(14b)\end{matrix}$$

and where $$t_{cr}{}^- = \begin{cases} t_{sai}{}^- + (p-\frac{1}{2})\tau, & t_{sai}{}^- + p\tau \leq t_{sbk}{}^- + q\tau \\ t_{sbk}{}^- + (p-\frac{1}{2})\tau, & t_{sai}{}^- + p\tau > t_{sbk}{}^- + q\tau \end{cases} \qquad \begin{matrix}(15a)\\(15b)\end{matrix}$$

Although use of the comparator has been discussed in detail only for the case where $X_a(t)$ alone is asynchronous and at least the 0-to-1 transitions of $X_b(t)$ are synchronized by 1-to-0 transitions of $C_1(t)$, the comparator can also be utilized effectively when both $X_a(t)$ and $X_b(t)$ are asynchronous and statistically independent of the clock signals. In the case of such fully asynchronous inputs, however, the presence or absence of an $X_c(t)$ pulse no longer indicates conclusively that a measured error $\epsilon$ is either within or outside of any single interval such as that shown in Relation (5). Rather, the comparator output must be interpreted on a statistical basis. To illustrate, if a given measurement is of an error having the normalized value $$\frac{\epsilon}{\tau} = x \qquad (16)$$

a function $G(x)$ can represent the probability that the measurement will initiate an $X_c(t)$ pulse. The probability $G(x)$ equals 1 only in the interval $$1-q \leq x \leq p-1, \quad p+q>2 \qquad (17)$$

and decreases linearly to remain 0 throughout the intervals $x \leq -q$ and $x \geq p$. Consequently, it is not possible to predict with complete certainty whether or not measurement of a normalized error in either of the intervals $$-q < \frac{\epsilon}{\tau} < 1-q$$

or $$p-1 < \frac{\epsilon}{\tau} < p$$

will initiate an $X_c(t)$ pulse. A typical $G(x)$ function is plotted in FIGURE 2.

To interpret the comparator output effectively, a statistical hypothesis can be formulated utilizing decision points located at $x_1$ and $x_2$. Under this measurement hypothesis, for a given measurement it will be assumed both that an $X_c(t)$ pulse indicates that $\epsilon/\tau$ lies within the confidence interval $$x_1 < \frac{\epsilon}{\tau} \leq x_2 \qquad (18)$$

and that absence of an $X_c(t)$ pulse indicates that either $$\frac{\epsilon}{\tau} \leq x_1 \qquad (19)$$

or $$\frac{\epsilon}{\tau} > x_2 \qquad (20)$$

No values of $x_1$ and $x_2$ exist which permit use of the measurement hypothesis with complete certainty. For example, if $$-q < x_1 < x_2 - p \qquad (21)$$

contrary to the hypothesis, an $X_c(t)$ pulse can be initiated even by a measured error outside of the confidence interval defined by Relation (18) when the normalized error is within either of the intervals $$-q < \frac{\epsilon}{T} \leq x_1 \quad (22)$$

or $$x_2 < \frac{\epsilon}{T} < p \quad (23)$$

Consequently, to determine the reliability of the measurement hypothesis with given values of $x_1$ and $x_2$, it is useful to evaluate two confidence coefficients. The first confidence coefficient equals the probability that a given $X_c(t)$ pulse has been initiated by a normalized measured error within the confidence interval defined by Relation (18). The second confidence coefficient is the probability that, for a given measurement, the normalized error is outside of the confidence interval if not $X_c(t)$ pulse is initiated.

To evaluate the confidence coefficients, for a given measurement let A be the event that the normalized error lies within the confidence interval defined by Relation (18), B be the event that an $X_c(t)$ pulse is initiated, and C be the event that $$x < \frac{\epsilon}{T} \leq x + dx$$

where $dx$ is infinitessimal. Evaluation of the first confidence coefficient, $C_B$, requires determination of the necessary conditional probability in accordance with the equation $$C_B = P(A/B) = \frac{P(AB)}{P(B)} \quad (24)$$

The conditional probability $P(B/C)$ approaches $G(x)$ as $dx$ approaches 0. Consequently, it can be written that $$G(x) = P(B/C) = \frac{P(BC)}{P(C)} = \frac{P(BC)}{f(x)dx} \quad (25)$$

where $f(x)$ is the probability density function of the normalized error and will be assumed to be continuous. The last expression in Relation (25) follows from observation that $$P(C) = f(x)dx \quad (26)$$

A typical continuous probability density function, $f(x)$, is also plotted in FIGURE 2.

Relation (25) can be solved for the probability that events B and C both result from a given measurement to yield $$P(BC) = f(x)G(x)dx \quad (27)$$

A typical $f(x)G(x)$ product is also plotted in FIGURE 2. The product $f(x)G(x)$ is a weighted density function which can be used to compute the probability that a given measurement will both initiate an $X_c(t)$ pulse and be of a normalized error within any specified interval. If the confidence interval defined by Relation (18) is selected, it follows that $$P(AB) = \int_{x_2}^{x_1} f(x)G(x)dx \quad (28)$$

while choice of an infinite interval leads to the probability $$P(B) = \int_{-\infty}^{\infty} f(x)G(x)dx \quad (29)$$

Substituting Relations (28) and (29) into Relation (24) yields the required relation $$C_B = \frac{\int_{x_1}^{x_2} f(x)G(x)dx}{\int_{-\infty}^{\infty} f(x)G(x)dx} \quad (30)$$

tor the first confidence coefficient.

The second confidence coefficient, $C_{\bar{B}}$, can be defined in a similar manner. This confidence coefficient is given by the equation $$C_{\bar{B}} = P(\bar{A}/\bar{B})$$

$$= \frac{\int_{-\infty}^{x_1} f(x)[1-G(x)]dx + \int_{x_2}^{\infty} f(x)[1-G(x)]dx}{\int_{-\infty}^{\infty} f(x)[1-G(x)]dx} \quad (31)$$

The same set of decision points $x_1$ and $x_2$ cannot normally maximize both the confidence coefficients $C_B$ and $$C_B \text{ and } C_{\bar{B}}$$

$C_{\bar{B}}$. Clearly $C_B$ is 1 if the relation $$x_1 \leq -q < p \leq x_2 \quad (32)$$

is satisfied. However, $C_B$ decreases from 1 if $x_1$ is decreased or $x_2$ is increased in violation of the relation $$1 - q \leq x_1 < x_2 \leq p - 1 \quad (33)$$

in order to conform with Relation (32).

Despite the incompatibility of Relations (32) and (33), values can be assigned to $x_1$ and $x_2$ which optimize both $C_B$ and $C_{\bar{B}}$ under given conditions. To determine these optimum values of $x_1$ and $x_2$, let $G_B$ and $L_B$ be the gain and the absolute value of the loss, respectively, if the measurement hypothesis associated with Relations (19) through (21) is valid or invalid when an $X_c(t)$ pulse is initiated, let $G_{\bar{B}}$ and $L_{\bar{B}}$ apply when a measurement does not initiate an $X_c(t)$ pulse. The quantities $G_B$, $G_{\bar{B}}$, $L_B$, and $L_{\bar{B}}$ are functions of $x_1$ and $x_2$. A figure of merit for the measurement hypothesis can now be defined as $$M(p, x_1, x_2) = [G_B C_B - L_B(1-C_B)]P(B)$$
$$+ [G_{\bar{B}} C_{\bar{B}} - L_{\bar{B}}(1-C_{\bar{B}})][1-P(B)] \quad (34)$$

The figure of merit defined by Equation (34) can be maximized by choosing the values of $p$, $q$ $x_1$, and $x_2$ in an appropriate manner (ref.: Carl W. Helstrom, Statistical Theory of Signal Detection, London, Pergamon Press, 1960).

A typical choice of decision points is $$x_1 = -q \quad (35)$$

and $$x_2 = p \quad (36)$$

With these decision points, every measurement which initiates an $X_c(t)$ pulse will be of a normalized error within the confidence interval $$-q < \frac{\epsilon}{T} \leq p \quad (37)$$

Consequently, the confidance coefficient $C_B$ is 1. The value of the confidence coefficient $C_{\bar{B}}$, however, depends upon the extent to which the chosen values of $p$ and $q$ satisfy the relation $$P(\bar{A}/\bar{B}) \gg 1 - P(\bar{A}/\bar{B}) \quad (38)$$

Operation of the comparator components shown in FIGURE 1 will now be described in detail with reference to FIGURE 3, which shows the logic diagram of the wave-edge comparator, and to FIGURE 4, which shows waveforms useful in explaining the operation of FIGURE 3. In FIGURE 4, time $t$ is the abscissa of every curve. The upper value of each curve is logical 1, and the lower value is logical 0.

All logical elements used in the comparator communicate by means of voltages which can assume steady-state values only in either of two mutually exclusive intervals. When in one arbitrarily selected interval, a voltage is said to be in the "true" state and to represent the logical value 1. When in the other interval, a voltage is said to be in the "false" state and to represent the logical value 0.

All flip-flops are of the JK type (ref.: Montgomery Phister, Jr., Logical Design of Digital Computers, New York, John Wiley & Sons, Inc., 1959, pp. 128–129, 134–135). Such a flip-flop is exemplified by flip-flop 201 in FIGURE 3. A flip-flop can assume either of two logical states. In the true (1) state, the 1 (normal) and 0 (complement) output terminals generate signals having the logical values 1 and 0, respectively. In the false (0) state, the 1 and 0 output terminals generate signals having the logical values 0 and 1, respectively.

Figure 4:
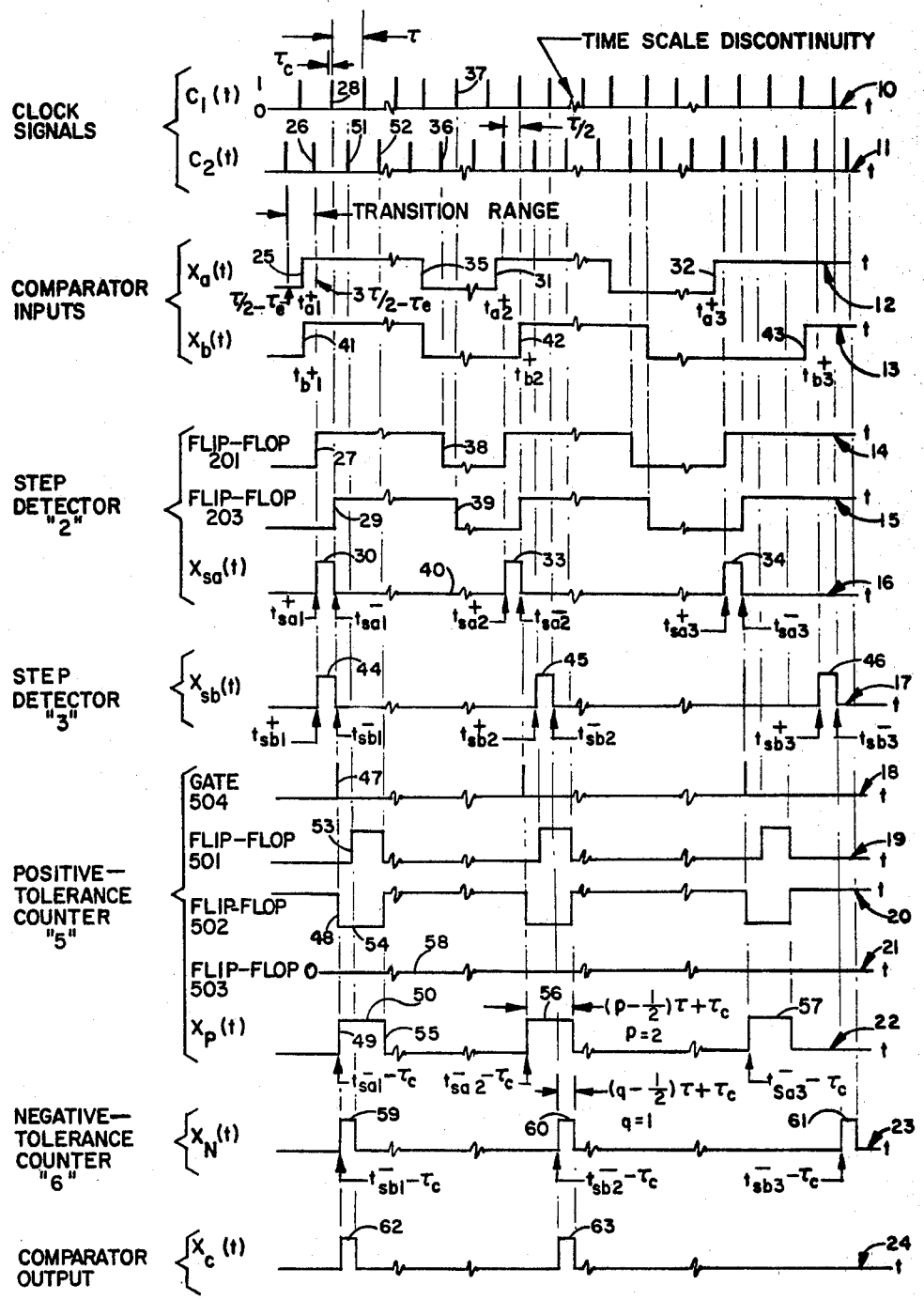
FIGURE 4 shows a series of logical waveforms useful in explaining the operation of the present invention.

Each flip-flop has an override-set input and an override-reset input, such as those shown entering the top and bottom, respectively, of flip-flop 201 in FIGURE 3. The override inputs do not affect the operation of a flip-flop when each such input has the logical value 0. System design must prevent both override inputs of a flip-flop from simultaneously assuming the logical value 1, because the response of the flip-flop to this condition cannot be predicted. When the logical value of either override input changes to 1, a flip-flop responds immediately, regardless of the states of all other inputs. A flip-flop remains in or assumes the true state in response to a 1 signal at the override-set input and remains in or assumes the false state in response to a 1 signal at the override-reset input.

When both override inputs are simultaneously 0, a flip-flop operates in a mode in which it is responsive to inputs at the J, K, and T terminals. In this mode, a flip-flop can change state only in response to a 1-to-0 transition of an input at the T (trigger) terminal. For the flip-flop to actually change state at such a time, however, appropriate logical values must have been applied to the J and K terminals continuously during the preceding period of length no less than $\tau_e$, where $\tau_e$ is the enabling time of the flip-flop. During this period, any one of four possible sets of logical values can be applied to the J and K terminals of the flip-flop. If a logical 0 is applied to both terminals, the flip-flop will not change state. If a logical 1 is applied to both terminals, the flip-flop will always change state. If a logical 1 and 0 are applied to the J and K terminals, respectively, the flip-flop will change to or remain in the true state. If a logical 0 and 1, respectively, are applied to the J and K terminals, the flip-flop will change to or remain in the false state.

All gates shown in FIGURE 3 are AND gates of the type described in the literature (Montgomery Phister, Jr., Logical Design of Digital Computers, supra, pp. 22–24, 32–33). Such a logical element is typified by gate 204 in FIGURE 3. A gate of this type produces a true output if, and only if, all inputs are simultaneously true.

The logical inverters employed are typified by inverter 202 in FIGURE 3. Such an element produces an output which is the logical complement of its input.

Response delay is an important characteristic of any logical element. To comprehend the following discussion of the wave-edge comparator, however, it is sufficient to recognize that a flip-flop requires a short time to respond to each 1-to-0 transition at its T terminal and, therefore, changes state only after the trigger signal initiating the change is false.

Two-phase clock 1 provides the synchronizing signals for the wave-edge comparator. Reference will be made to the significant characteristics of the output signals of two-phase clock 1, rather than to the internal operation of the clock, since a comprehensive discussion of the internal operation is described in my copending application Ser. No. 394,977, filed Sept. 8, 1964, and entitled "Digital Reference Source."

The logical outputs $C_1(t)$ and $C_2(t)$ of two-phase clock 1, each a pulse train of period $\tau$, are shown as curves 10 and 11 in FIGURE 4. The first pulse of $C_1(t)$ shown is last true at time $\tau$, the first pulse of $C_2(t)$ at time $\tau/2$. Idealized pulses of length $\tau_c$ approaching 0 are shown in both trains. Instantaneous logical values of discrete binary signals are plotted in FIGURE 4, rather than the voltage levels to which these logical values correspond. The mathematical relationship between $C_1(t)$ and $C_2(t)$ is given by Relation (1).

The logic diagrams of step detectors 2 and 3 appear in FIGURE 3. Since both step detectors are identical, explanation of the operation of one will suffice to explain the operation of both.

Step detector 2 consists basically of two flip-flops, 201 and 203. The first input signal, $X_a(t)$, is applied to the J input terminal of flip-flop 201. Input signal $X_a(t)$ is also applied to inverter 202, and the resultant complement $\overline{X}_a(t)$ is applied to the K input terminal of flip-flop 201. Clock signal $C_2(t)$ is applied to the T input terminal of flip-flop 201. Upon termination of the first $C_2(t)$ pulse ending at least $\tau_e$ after $X_a(t)$ changes state, flip-flop 201 assumes the same logical state as $X_a(t)$ and remains in this state until after $X_a(t)$ again changes state. The 1 output terminal of flip-flop 201 is connected to the J input terminal of flip-flop 203 and to a first input of AND gate 204. The 0 output terminal of flip-flop 201 is connected to the K input terminal of flip-flop 203. clock signal $C_1(t)$ is applied to the T input terminal of flip-flop 203. The 0 output terminal of flip-flop 203 is connected to the second input of AND gate 204. The output of step detector 2, $X_{sa}(t)$, is derived from AND gate 204. The state of flip-flop 203 at time $t$ is always the same as that of flip-flop 201 at time $$t - \frac{\tau}{2}$$

Therefore, in each interval of duration $\tau/2$ following a 0-to-1 transition of flip-flop 201, true signals exist at the 1 output terminal of flip-flop 201 and at the 0 output terminal of flip-flop 203. Whenever this condition occurs, a true pulse is emitted at the output $X_{sa}(t)$ by AND gate 204. At all other times, $X_{sa}(t)$ is false.

The operation of step detector 3 is the same as that just described for step detector 2 and can be derived from said description by substituting $X_b(t)$ for $X_a(t)$, by substituting $X_{sb}(t)$ for $X_{sa}(t)$, and by adding 100 to the number designating each inverter, flip-flop, and AND gate to which reference was made in discussing step detector 2.

Waveforms relating to step detectors 2 and 3 when $t > 0$ appear in FIGURE 4. The respective inputs $X_a(t)$ and $X_b(t)$ of step detectors 2 and 3, which are also the inputs of the wave-edge comparator, are shown as waveforms 12 and 13. In the following discussion, the case will be considered where $X_a(t)$ and $X_b(t)$ are both asynchronous, although either or both of these signals can be synchronized with the trailing edges of pulses of either $C_1(t)$ or $C_2(t)$. Furthermore, it should be noted that because of synchronization by step detectors 2 and 3, any transition of $X_a(t)$ or $X_b(t)$, such as transition 25 of $X_a(t)$, could also have occurred at any time later than the last, but no later than the next or current, instant $\tau_e$ before a 1-to-0 transition of $C_2(t)$ without modifying the response of the comparator.

The outputs of flip-flops 201 and 203 in step detector 2 appear as waveforms 14 and 15, while the output of step detector 2 is shown as waveform 16. After $X_a(t)$ goes true at 25, flip-flop 201 responds to the trailing edge of the next $C_2(t)$ pulse, at 26, by also going true at 27. The trailing edge of the succeeding $C_1(t)$ pulse, at 28, then causes flip-flop 203 to also assume the true state at 29. In the period between 27 and 29, a true pulse 30 appears at $X_{sa}(t)$. Similarly, 0-to-1 transitions of $X_a(t)$ at 31 and 32 cause $X_{sa}(t)$ pulses to be generated at 33 and 34, respectively.

Neither step detector is responsive at its output to 1-to-0 transitions of its input signal. For example, immediately after the 1-to-0 transition of $X_a(t)$ at 35, the flip-flops 201 and 203 in step detector 2 respond to the trailing edges of the following $C_2(t)$ and $C_1(t)$ pulses, at 36 and 37, by going successively false at 38 and 39. Nevertheless, $X_{sa}(t)$ does not respond at 40.

The output of step detector 3 is shown as waveform 17 in FIGURE 4. In response to the 0-to-1 transitions of the comparator input $X_b(t)$ at 41, 42, and 43, flip-flops 301 and 303 cause AND gate 304 to emit true $X_{sb}(t)$ pulses at 44, 45, and 46, respectively.

The logic diagram of error detector 4 is also shown in FIGURE 3. Error detector 4 consists of a positive-tolerance counter 5, a negative-tolerance counter 6, and a pass gate 7. Tolerance counters 5 and 6 are similar. Both counters count $C_2(t)$ pulses and can be reset to 0. Positive-tolerance counter 5 establishes the parameter $p$ by being preset to stop counting $C_2(t)$ pulses when the count $C_P(t)$ which it contains equals the value of $p$. Likewise, negative-tolerance counter 6 establishes the parameter $q$ by being preset to stop counting $C_2(t)$ pulses when the count $C_N(t)$ which it contains equals the value of $q$. Although tolerance counters 5 and 6 need not have identical capacities nor be of any specific type, both units shown in FIGURE 3 are three-stage binary counters capable of counting from 0 (binary 000) to 7 (binary 111) when appropriately preset.

Because of the similarity of tolerance counters 5 and 6, only positive-tolerance counter 5 will be described in detail. Any positive number of binary stages $v$ can be employed, subject to response-propagation considerations, in order to obtain a positive-tolerance counter having the capacity $$(C_P)_{max} = 2^v - 1 \geq p \qquad (39)$$

However, the case where $v=3$ will be described specifically.

Positive-tolerance counter 5 is basically a three-stage binary ripple counter consisting of flip-flops 501, 502, and 503 with associated reset and preset logic. The T input terminal of flip-flop 501, the lowest-order flip-flop, is connected to the clock signal $C_2(t)$. Consequently, whenever a signal having the logical value 1 is applied simultaneously to its J and K input terminals, flip-flop 501 changes state in response to every 1-to-0 transition of $C_2(t)$. Both the J and K input terminals of flip-flops 502 and 503 are connected to a fixed voltage of logical value 1, and the T input terminal of each of these flip-flops is connected to the 1 output terminal of the flip-flop of the next lowest order. More particularly, the T input terminal of flip-flop 502 is connected to the 1 output terminal of flip-flop 501, and the T input terminal of flip-flop 503 is connected to the 1 output terminal of flip-flop 502. Consequently, the state of each of these higher-order flip-flops changes when the state of the preceding counter stage goes from 1 to 0. When enabled, positive-tolerance counter 5 thus counts the trailing edges of $C_2(t)$ pulses applied to the T input terminal of flip-flop 501 to provide an instantaneous positive-tolerance count $$C_P(t) = \sum_{i=0}^{2} F_{501+i}(t) 2^i \qquad (40)$$

In Relation (40), $F_{501+i}(t)$ represents the instantaneous logical state (0 or 1) of flip-flop $501+i$.

Appropriate reset logic starts the counter with the count $C_P(t)=0$. This is accomplished by applying $X_{sa}(t)$ from step detector 2 to a reset AND gate 504 together with the clock signal $C_1(t)$. The output of reset AND gate 504 is applied to the override-reset input terminal of each of flip-flops 501 through 503. The override-set input of each of flip-flops 501 through 503 is connected to a fixed voltage of logical value 0. Therefore, each time an $X_{sa}(t)$ pulse and a $C_1(t)$ pulse are simultaneously applied to reset AND gate 504, a true pulse is transmitted to the override-reset input terminal of each flip-flop to reset, and thereby start, the counter.

Appropriate preset logic determines the number of $C_2(t)$ pulses that positive-tolerance counter 5 will count after being reset. The responsiveness of positive-tolerance counter 5 to $C_2(t)$ pulses depends upon whether the signal applied to the J and K input terminals of flip-flop 501 has the logical value 1 or 0. The preset logic consists of an inverter 505, an AND gate 506, and a plurality of switches 507, 508, and 509. The J and K inputs of flip-flop 501 are connected to the output of inverter 505. Inverter 505 is driven by preset AND gate 506. AND gate 506 receives one input from each of flip-flops 501, 502, and 503. Whether the 1 or 0 output terminal of a specific flip-flop is connected to AND gate 506 is determined by the position of the associated single-pole, double-throw switch, viz, switch 507 in the case of flip-flop 501, switch 508 in the case of flip-flop 502, and switch 509 in the case of flip-flop 503. Such switches can be actuated either manually for local adjustment of tolerances or electrically for remote adjustment. The switches can also be controlled automatically for adaptive variation of tolerances.

The preset logic is so connected that pulses of $C_2(t)$ are counted cyclically at all times except when the positive-tolerance count $C_P(t)$ equals the preset value $$p = \sum_{i=0}^{2} p_i 2^i \qquad (41)$$

where $p_i$ represents the state of switch $507+i$. As shown in FIGURE 3, $p_i$ is 1 when switch $507+i$ connects the 1 output terminal of flip-flop $501+i$ to AND gate 506 and is 0 when switch $507+i$ connects the 0 output terminal of flip-flop $501+i$ to AND gate 506. Consequently, once positive-tolerance counter 5 has been reset so that $C_P(t)$ is 0, the enabling inputs J and K of flip-flop 501 are held true until $p$ pulses of $C_2(t)$ have been counted. The count $C_P(t)$ then equals $p$ and counting stops. For the case illustrated in FIGURE 3 where $p=2$ (binary 010), switch 507 is positioned to transmit the 0 output of flip-flop 501, switch 508 to transmit the 1 output of flip-flop 502, and switch 509 to transmit the 0 output of flip-flop 503.

The normally false output, $X_P(t)$, of positive-tolerance counter 5 is obtained from the output of inverter 505. Each time positive-tolerance counter 5 is reset, a pulse of length $(p-\frac{1}{2})\tau + \tau_c$ starting at time $t_{sai}^+ - \tau_c$ is emitted, where $i$ is a positive integer.

Negative-tolerance counter 6 operates in a maner similar to that of positive-tolerance counter 5 except for the enabling inputs $X_{e1}(t)$ and $X_{e2}(t)$ applied to reset AND gate 604. Negative-tolerance counter 6 can be reset only when these two enabling signals are simultaneously true, i.e., when $C_1(t) X_{e1}(t) X_{e2}(t) X_{sb}(t) = 1$.

Pulses of $C_2(t)$ are counted cyclically by negative-tolerance counter 6 at all times except when the negative-tolerance count $C_N(t)$ equals the preset value.

$$q = \sum_{i=0}^{w-1} q_i 2^i \qquad (42)$$

where $w$ is the number of stages in negative-tolerance counter 6 and $q_i$ represents the state of switch $607+i$. For the case illustrated in FIGURE 3 where $q=1$ (binary 001), switch 607 is positioned to transmit the 1 output of flip-flop 601, switch 608 to transmit the 0 output of flip-flop 602, and switch 609 to transmit the 0 output of flip-flop 603.

The output signal $X_N(t)$ is normally false. Each time negative-tolerance counter 6 is enabled by an $X_{sb}(t)$ pulse, however, a pulse of length $(q-\frac{1}{2})\tau + \tau_c$ starting at time $t_{sbk}^- - \tau_c$ is emitted.

Otherwise, the operation of negative-tolerance counter 6 is the same as that just described for positive-tolerance counter 5 and can be derived from the preceding description by substituting $X_{sb}(t)$ for $X_{sa}(t)$, by substituting $X_N(t)$ for $X_P(t)$, and by adding 100 to the number designating each inverter, flip-flop, AND gate, and switch to which reference was made in discussing positive-tolerance counter 5.

Waveforms relating to positive-tolerance counter 5 are shown in FIGURE 4 for the case where $p=2$ (binary 010). More particularly, waveform 18 shows the output of reset AND gate 504, waveforms 19, 20, and 21 show the outputs of flip-flops 501, 502, and 503, respectively, and waveform 22 shows the output $X_P(t)$ of positive-tolerance counter 5.

In accordance with Relation (40), the states of flip-flops 501, 502, and 503 initially indicate that positive-tolerance counter 5 has stopped at the preset value $C_P(t)=p=2$ (binary 010). When the true $X_{sa}(t)$ pulse at 30 enables reset AND gate 504, however, the $C_1(t)$ pulse at 28 is transmitted by AND gate 504 at 47 to reset any flip-flop not already in the false state, thereby starting the counter at $C_p(t)=0$ (binary 000). Consequently, flip-flop 502 goes false at 48.

The signal $X_P(t)$ goes true at 49 because at least one input signal of preset AND gate 506 now has the logical value 0. Since preset switches 507, 508, and 509 have been set in accordance with Relation (41) to represent the number $p=2$ (binary 010), $X_P(t)$ will remain true until flip-flops 501 and 503 are false and flip-flop 502 is true. Because $X_P(t)$ is used to enable the lowest-order flip-flop, 501, however, $C_2(t)$ pulses will be counted as long as the $X_P(t)$ pulse at 50 remains true.

Flip-flop 501 responds to the $C_2(t)$ pulse at 51 by going true at 53, flip-flops 502 and 503 remaining false to yield a count $C_P(t)=1$ (binary 001). The next $C_2(t)$ pulse, at 52, initiates a 1-to-0 transition at the 1 output terminal of flip-flop 501, which causes flip-flop 502 to go true. The positive-tolerance count $C_P(t)$ is then 2 (binary 010).

For the first time since flip-flop 502 went false at 48, all inputs to the preset AND gate 506 are now true. Consequently, AND gate 506 transmits a true output to inverter 505, the output $X_P(t)$ of which responds by going false at 55, thereby stopping the counter until another $X_{sa}(t)$ pulse appears. In this manner, at a time $\tau_c$ before its termination, each $X_{sa}(t)$ pulse initiates the required $X_P(t)$ pulse of duration $(p-\frac{1}{2})\tau+\tau_c$. Thus, the succeeding $X_{sa}(t)$ pulses at 33 and 34 cause the $X_P(t)$ pulses at 56 and 57, respectively, to be generated. The output of flip-flop 503 remains false continuously at 58 because a value of $p$ less than 4 (binary 100) was chosen for illustration.

The normally false output $X_N(t)$ of negative-tolerance counter 5 is shown as waveform 23 in FIGURE 4 for the case where $q=1$ (binary 001). For all values of $t$ shown in FIGURE 4, the enabling signals $X_{e1}(t)$ and $X_{e2}(t)$ are simultaneously true in accordance with Relation (4). At a time $\tau_c$ before its termination, each of the $X_{sb}(t)$ pulses at 44, 45, and 46, respectively, initiates a corresponding $X_N(t)$ pulse of length $(q-\frac{1}{2})\tau+\tau_c$ shown at 59, 60, and 61.

As shown in FIGURE 3, the outputs of positive-tolerance counter 5 and negative-tolerance counter 6 are applied to the inputs of pass gate 7. Pass gate 7 generates an output pulse whenever an error measurement passes the test defined by Relation (12). If both $X_a(t)$ and $X_b(t)$ are asynchronous and statistically independent of $C_1(t)$, as in the case illustrated in FIGURE 4, it is then assumed that the error measured satisfies Relation (18). If $X_b(t)$ is synchronized by 1-to-0 transitions of $C_1(t)$, the error measured satisfies Relation (5).

Pass gate 7 consists of a single component, AND gate 701, which receives, as its inputs, $X_P(t)$ from positive-tolerance counter 5 and $X_N(t)$ from negative-tolerance counter 6. When both $X_{e1}(t)$ and $X_{e2}(t)$ are simultaneously true, AND gate 701 functions to indicate by a true pulse at $X_c(t)$ that adjacent 0-to-1 transitions of $X_a(t)$ and $X_b(t)$ satisfy Relation (12). AND gate 701 identifies this condition from simultaneous occurrence of the conditions $X_P(t)=1$ and $X_N(t)=1$ at its inputs. The output $X_c(t)$ of AND gate 701 also constitutes the output of pass gate 7 and of the wave-edge comparator.

The normally false output of pass gate 7 is shown as waveform 24 in FIGURE 4. This signal goes true only during those intervals when $X_P(t)$, shown as waveform 22, and $X_N(t)$, shown as waveform 23, are simultaneously true. Thus, the $X_P(t)$ and $X_N(t)$ pulses at 50 and 59, respectively, overlap to generate the $X_c(t)$ pulse at 62. Similarly, the $X_P(t)$ and $X_N(t)$ pulses at 56 and 60, respectively, overlap to generate the $X_c(t)$ pulse at 63. Because the $X_P(t)$ and $X_N(t)$ pulses at 57 and 61, respectively, do not overlap, they do not initiate an $X_c(t)$ pulse.

Although the positive transitions of $X_a(t)$ and $X_b(t)$ at 25 and 41, respectively, coincide, the positive transitions of $X_a(t)$ at 31 and 32 progressively lead those of $X_b(t)$ at 42 and 43, respectively. The $X_c(t)$ pulses at 62 and 63 indicate that the sets of $X_a(t)$ and $X_b(t)$ transitions at 25 and 41 and at 31 and 42 have initiated sets of $X_{sa}(t)$ and $X_{sb}(t)$ pulses at 30 and 44 and at 33 and 45 which satisfy Relation (12). Conversely, since no corresponding $X_c(t)$ pulse results, the comparator indicates that the set of $X_a(t)$ and $X_b(t)$ pulses at 32 and 43 has generated a set of $X_{sa}(t)$ and $X_{sb}(t)$ pulses at 34 and 46 which fails to satisfy Relation (12).

It is, therefore, seen that there is provided, in accordance with the present invention, a wave-edge comparator which is operative to indicate, by digital means and on a "go" or "no-go" basis, whether or not the time displacement between corresponding transitions of two logical signals is within predetermined tolerances. Either or both of the signals can be asynchronous. The bilateral tolerances utilized can be unequal and can be remotely adapted to meet time-varying operating conditions.

The comparator of the present invention provides several unique advantages. A discrete output is produced which requires no further interpretation. In addition to being bilateral, the tolerances utilized can be unequal. All components are standard digital types, making microminiaturization straightforward and leading to high operational reliability. The output of the comparator is fully compatible with the input requirements of typical on-line computational equipment.

While the invention has been described with respect to the preferred physical embodiment constructed in accordance therewith, it will be apparent to those skilled in the art that various modifications and improvements may be made without departing from the scope and spirit of the invention.

I claim:

1. Means responsive to signals received in first and second channels, said means comprising: a source of clock pulses; means for determining whether a signal in said first channel occurs within a first selectable time, as a function of said clock pulses, after a signal in said second channel;

means for determining whether a signal in said second channel occurs within a second selectable time, as a function of said clock pulses, after a signal in said first channel.

2. The combination of claim 1 wherein said first and second selectable times are independently selectable as a function of said clock signal.

3. In combination:

means responsive to a first input signal for generating a third signal having a selectable time duration;

means responsive to a second input signal for generating a fourth signal having a time duration which is independently selectable from said first time duration; and means for determining coincidence between said third and fourth signals;

a source of clock pulses; and wherein said means for generating a third signal comprises:

first preset counting means responsive to said first input signal for counting said clock pulses until a first predetermined count is reached and for generating a first pulse whose duration is proportional to said first predetermined count; and wherein said means for generating a fourth signal comprises:

second preset counting means responsive to said second input signal for counting said clock pulses until a second predetermined count is reached and for generating a second pulse whose duration is proportional to said second predetermined count.

4. The combination of claim 3 wherein said means for determining coincidence comprises:

gate means responsive to said first and second pulses for generating an output pulse upon the simultaneous occurrence of said first and second pulses.

5. The combination of claim 3 wherein said first and second predetermined counts are independently selectable.

6. In combination:

means for generating a first signal upon the occurrence of a first event and a second signal upon the occurrence of a second event; and means responsive to said first and second signals for generating an output signal when the time displacement between said first and second signals lies within prescribed bilateral tolerances;

said means for generating first and second signals comprises:

a first step detector responsive to a signal indicating the occurrence of said first event for generating a first pulse of predetermined duration a predetermined time after the occurrence of said first event indicating signal; and a second step detector responsive to a signal indicating the occurrence of said second event for generating a second pulse of predetermined duration a predetermined time after the occurrence of said second event indicating signal.

7. The combination of claim 6 wherein said means for generating an output signal comprises:

a positive-tolerance counter responsive to said first pulse for generating a third pulse the duration of which is adjustable to set the permissible time displacement between said first and second signals when said first signal occurs first in time;

a negative-tolerance counter responsive to said second pulse for generating a fourth pulse the duration of which is adjustable to set the permissible time displacement between said first and second signals when said second signal occurs first in time; and gate means responsive to said third and fourth pulses for generating said output signal upon the simultaneous occurrence of said third and fourth pulses.

8. The combination of claim 7 further comprising:

a source of clock pulses, said clock pulses being applied to said first and second step detectors and said positive- and negative-tolerance counters for synchronizing the leading and trailing edges of said first, second, third and fourth pulses.

9. The combination of claim 7 further comprising:

a source of clock pulses; and wherein said positive-tolerance counter comprises:

first preset counting means responsive to said first pulse for counting said clock pulses until a first predetermined count is reached and for generating said third pulse whose duration is proportional to said first predetermined count; and wherein said negative-tolerance counter comprises:

second preset counting means responsive to said second pulse for counting said clock pulses until a second predetermined count is reached and for generating said fourth pulse whose duration is proportional to said second predetermined count.

10. The combination of claim 9 wherein said first and second predetermined counts are independently adjustable.

References Cited

UNITED STATES PATENTS

| 2,861,184 | 11/1958 | Alexander et al. | 328—109 X |
|---|---|---|---|
| 2,866,092 | 12/1958 | Raynsford | 328—109 X |
| 3,138,759 | 6/1964 | Thompson | 328—109 X |
| 3,139,539 | 6/1964 | Hewett | 307—234 |
| 3,209,265 | 9/1965 | Baker et al. | 328—109 X |
| 3,268,743 | 8/1966 | Nourney | 328—109 X |

MALCOLM A. MORRISON, Primary Examiner

C. E. ATKINSON, Assistant Examiner

U.S. Cl. X.R.

307—232; 328—109